Patented July 15, 1947

2,424,085

UNITED STATES PATENT OFFICE 2,424,085

SUPPORTED SILVER CATALYST AND ITS PREPARATION

Ingolfur Bergsteinsson, Billings, Mont., and Harry de V. Finch, Berkeley, Calif., assignors to Shell Development Company, San Francisco, Calif., a corporation of Delaware No Drawing. Application August 11, 1943, Serial No. 498,430

8 Claims. (Cl. 252—204)

This invention relates to silver catalysts, particularly such as are used in the direct catalytic oxidation of olefins to olefin oxides, as well as to a method for the preparation of such silver catalysts. More particularly, the invention is directed to novel catalysts comprising a substantially inert support material comprising silicon, silicon carbide, or silicon-silicon carbide aggregates, and an adherent, uniform and preferably pellicular deposit of silver formed in the presence of the support material and upon the surface thereof. The invention is also directed to a practical and economical method of preparing such catalysts.

Silver catalysts are well known. They have been prepared both in the massive form and in a finely divided state. In the massive form they have been prepared as silver leaf, sponge, mesh, pellet, etc. Finely divided silver catalysts have been prepared by thermally decomposing suitable silver compounds, preferably in a reducing or inert medium, or by precipitating metallic silver from solutions or suspensions of silver compounds. Finely divided silver has been deposited in this manner upon suitable carriers or support materials, e. g. charcoal, diatomaceous earth, crushed firebrick, fuller's earth, fused alumina, marble, sandstone, selected clays, and the like.

The use of these well known catalysts is attended by certain disadvantages. For instance, the massive catalysts require too much silver to be commercially attractive. Similarly, the finely divided unsupported catalysts of the prior art require relatively large amounts of silver and in addition they tend to sinter and lose their activity. The known supported silver catalysts lack durability of structure, especially when contacted with liquids either prior to or during the operation of the catalytic process in which they are used; they tend to lose their initial catalytic activity too rapidly, particularly at elevated temperatures, and also lack uniformity of composition. Such lack of uniformity results in variations in catalyst behavior during operation, thereby necessitating costly and time-consuming readjustment of operating conditions whenever the catalyst is replaced.

It is an object of this invention to avoid the above and other defects of the prior art and to provide novel and superior silver-metal-containing catalyst compositions having a high initial activity in a wide variety of chemical reactions and capable of retaining their high activity over long periods of use, e. g. for several hundred hours of operation at elevated temperatures. It is another object to provide compositions containing comparatively very small, but nevertheless adequate amounts of the costly silver metal per unit volume of catalyst, these compositions being characterized by exceptional durability, high thermal conductivity and superior retention of catalytic activity under widely varying conditions of use.

Broadly stated, the catalysts of the present invention consist of or comprise silicon in the elemental form, silicon carbide, or porous aggregates of silicon and silicon carbide mixed with or supporting metallic silver. The support material may comprise both elemental silicon and silicon carbide, and the elemental silicon may be used in either the amorphous or the crystalline state. Particularly suitable and preferred support materials of extreme durability and good thermal conductivity are porous aggregates which consist of or comprise elemental silicon, silicon carbide, or mixtures of silicon and silicon carbide wherein the constituents have been bonded together at high temperatures with a ceramic bonding material, and the resulting porous aggregate crushed and screened to suitable particle size, e. g. from about 4 to about 14 mesh. The ceramically bonded support material should preferably contain from about 60% to about 80% by weight and more preferably at least about 70% by weight of elemental silicon and/or silicon carbide. Good results have been obtained by fusing a bonding material having a high alumina content with the silicon and/or silicon carbide, in such proportions that the final ceramically bonded support material will contain from about 3% to about 12% by weight and preferably about 5% to about 8% by weight, of alumina. Silver catalysts having ceramically bonded silicon carbide as the support material have a thermal conductivity superior to such materials as Alundum, fused kieselguhr, and the like, thereby greatly facilitating the maintenance throughout the catalyst bed of a temperature uniformly within the well-defined temperature range generally essential to efficient and economic operation of a catalytic process.

The catalysts of the present invention are prepared by combining the above defined materials comprising elementary silicon, silicon carbide and mixtures thereof with silver in a form rendering it particularly effective as a catalytic material. The method for depositing silver in such particularly effective form consisting of a uniform, adhering, pellicular deposit upon a carrier broadly, and the products thereby obtained, have been described and claimed in our copending application Serial Number 498,428 filed August 11, 1943. It has now been found that the combination of the pellicular type of silver as obtained by the method described in said copending application, with a member of the above-defined group of materials comprising elementary silicon, silicon carbide and mixtures thereof in the form of a support material, results in catalysts possessing particularly desirable characteristics. Production of these highly desirable catalysts of the present invention comprising silver in a uniform, adhering, pellicular form in combination with a member of the well defined group of materials comprising elementary silicon, silicon carbide, and mixtures thereof is attained by silvering a carrier or support material, comprising silicon, silicon carbide, or silicon-silicon carbide aggregates, by treating it successively and preferably in the order named with a solution or suspension of a silver compound, ammonia or ammonium hydroxide, a strong base, such as sodium hydroxide, a further quantity of ammonia or ammonium hydroxide, and a reducing agent. Upon allowing the carrier or support material to stand in contact with each of these reagents, for optimum periods of time, a thin film of silver, usually in the form of a silver mirror, is deposited upon the support. This forms the desired catalytic surface.

More specifically stated, the novel silver catalysts of the invention may be prepared by a process including the following steps: heating a mixture comprising elemental silicon, silicon carbide, or silicon-silicon carbide aggregates and a solution or suspension of an organic or inorganic silver compound, such as silver oxalate, silver tartrate, or silver nitrate; adding an ammonium hydroxide solution or gaseous ammonia to the solution of the silver salt in which the support material is immersed, the ammonia or ammonium hydroxide being added in an amount just sufficient to dissolve the silver oxide precipitate formed by the addition of the first small quantities of the reagent; adding a sufficient amount of a strong base, e. g. sodium hydroxide or potassium hydroxide, to make the solution strongly alkaline and to precipitate the silver as silver oxide; adding a further quantity of ammonia or ammonium hydroxide in an amount just sufficient to dissolve the silver oxide precipitate and to maintain the silver in solution as the silver-ammonia complex; adding a reducing agent such as glucose, sodium potassium tartrate, hydrazine, phenyl-hydrazine, hydroxylamine, or aliphatic aldehydes, e. g. formaldehyde; and allowing the resulting mixture of silver solution and reducing agent to stand with or without heating until a thin, uniform film of metallic silver, usually in the form of a silver mirror, is deposited upon the support surface.

In a preferred embodiment of the procedure for making the catalysts of the invention elemental silicon, silicon carbide, or silicon-silicon carbide aggregates may be added to an aqueous solution of silver nitrate, the mixture being boiled for from 10 minutes to 30 minutes in order to impregnate thoroughly the support material with the silver nitrate solution. Ammonium hydroxide is then slowly added in an amount just sufficient to redissolve the precipitate initially formed. To this solution there is then slowly added an aqueous solution of a strong base, e. g. sodium hydroxide in an amount which may vary between a slight excess and about three times the stoichiometric equivalent required to convert the silver present to silver oxide, the amount of the base thus added being in any case sufficient to make the solution strongly alkaline. Ammonium hydroxide is then added in an amount just sufficient to dissolve the silver oxide precipitate and to maintain the silver in solution. A reducing agent comprising glucose is then added to the mixture to reduce the redissolved silver compound and to precipitate the metallic silver upon the inert support material. The mixture of silvering solution, reducing solution and support material may be allowed to stand at room temperature for a period of time sufficient to effect the deposition of the desired amount of metallic silver upon the support. The time required will vary with the nature of the solutions used, but may be, for example, from about ½ to about 1½ hours. After the mixture has stood for the desired period of time, the liquid may be decanted from the catalyst, which latter may then be washed with water, for example, by decantation, to remove any water soluble material. The catalyst so prepared is in an active form and need not be subjected to any additional treatment, e. g. activation or drying. However, if desired, the catalyst composition may be dried by any suitable means, as by heating or subjection to reduced pressure.

If glucose is used as the reducing agent in the above reduction step, the glucose reagent may vary widely in composition but may be prepared, for example, by dissolving 80 grams of cane sugar in 800 cc. of water and adding 100 cc. of ethanol containing 3.5 cc. of concentrated nitric acid. The resulting solution may be boiled for about 5 minutes and cooled to about 20° C. prior to its addition to the basic ammoniacal silver solution containing the support material.

Although the foregoing represents a preferred procedure for preparing the silver catalysts of the invention, the procedure used may vary within reasonably wide limits. For instance, instead of impregnating the carrier with a silver salt solution and then adding ammonium hydroxide, an ammoniacal silver salt solution may be prepared and the carrier material impregnated therewith. Alternatively, a silvering solution comprising a suitable silver salt, an alkali metal hydroxide, ammonium hydroxide and a reducing agent may be prepared as described above prior to the addition of the support material. The support material may then be added thereto and its silvering effected in the usual manner. In such a case, however, the support material must be added substantially immediately after mixing the components of the silvering solution. Other modifications may be made as necessary without departing from the scope of the invention as defined hereinabove.

The silver content of the catalyst may be increased, if desired, by repeating the above operations. The silver may be deposited by means of a plurality of separate steps employing the same or different methods of depositing silver upon the support. Good results have been obtained by depositing a primary coating of pellicular silver upon the support by the action of a reducing agent upon an ammoniacal solution of a silver compound in the presence of the support and impregnating the resulting deposited silver catalyst with additional silver. The impregnation with additional silver may be effected by any desired means, for example, by impregnating the deposited silver catalyst with an aqueous solution of silver nitrate, evaporating to dryness, and reducing the silver nitrate to metallic silver.

The invention is not restricted to catalyst compositions containing a specified ratio of silver metal to carrier or support material. The concentration of the silver metal in the catalyst composition will generally depend upon the specified use to which it is to be put. In general, the preferred catalyst compositions are those wherein the support or carrier material is in gravimetric excess of the silver metal. For most purposes, catalyst compositions containing from about 0.5% to about 45% of silver metal (based on the total catalyst mass) are satisfactory, but those containing higher or lower concentrations of silver are also suitable and are considered within the scope of the invention.

Although the catalysts (when prepared in accordance with the above description) are already in an active form, their activity may, in many instances, be further promoted or modified by the addition, in any desired or optimum amount, of any one or more of a plurality of elements or compounds which are known to promote or modify the catalytic activity of silver metal. Representative promoters are, for example, the metals such as gold, copper, platinum, nickel, iron, etc.; the metal oxides and other metal compounds, particularly the alkali metal and alkaline earth metal oxides, hydroxides and carbonates; and some halogen compounds. The activity of the catalysts may also be materially increased by the addition of small amounts of a sodium compound as a promoter. In such a case, the promoted catalysts may be prepared by adding the desired quantity, i. e. up to about 8%, calculated as percent of silver present, of a sodium compound, e. g. sodium hydroxide or sodium nitrate. The sodium compound may be conveniently added in the form of an aqueous solution which is poured over the silvered support, the excess sodium solution being then removed by decantation and the wet silvered support dried to leave a deposit of sodium compound upon the catalyst surface. In the case of some catalysts prepared by precipitating the silver from a silvering solution on the catalyst surface, it has been found particularly effective to dilute the mixture of silvered support material and residual silvering solution with about three volumes of water. The silvered support material is then drained and dried. This procedure leaves a residue of sodium compounds from the silvering solution on the catalyst surface and results in the formation of a particularly active catalytic surface. Promoted catalysts of this type generally give higher yields and higher conversions than do the unpromoted catalysts. They are also active at lower temperatures and are less susceptible to poisoning.

The activity of the catalysts of the invention may be considerably increased by treating the support material comprising elemental silicon and/on silicon carbide with dilute solutions of hydrofluoric acid prior to the deposition of the silver thereupon. The support material may be immersed, for example, in a 3% to 10% and preferably about a 5% aqueous solution of hydrofluoric acid until the desired degree of activation is effected. Usually, immersion for about one hour at room temperature is sufficient.

The following examples are given as illustrative of the novel catalysts of the invention and of methods for their preparation.

Example I 100 cc. of crystalline elemental silicon was boiled with distilled water for 15 minutes, washed thoroughly by decantation to remove suspended particles, drained, and boiled for fifteen minutes with 200 cc. of a 0.147 N silver nitrate solution. The mixture was then cooled to about 20° C. Thereafter 6 cc. of 28% NH4OH and 100 cc. of 0.8 N NaOH were slowly and consecutively added with stirring. An additional 3 cc. of 28% NH4OH was then added and the stirring continued for about 5 minutes.

A reducing solution was prepared by dissolving 80 grams of cane sugar in 800 cc. of water, adding 100 cc. of ethyl alcohol and 3.5 cc. of concentrated nitric acid to the sugar solution, and boiling the resulting solution for about 5 minutes.

12 cc. of this reducing solution was rapidly added to the mixture of silicon and silver solution. The resulting mixture was allowed to stand for one hour with occasional shaking, whereupon the liquid was decanted from the silvered silicon and the silicon was washed. The finished catalyst contained 2.4 grams of silver per 100 cc. of catalyst.

Example II

Ceramically bonded porous aggregates of silicon carbide were prepared by fusing silicon carbide with sufficient alumina or alumina clay to give a composition containing from about 60% to about 80% by weight of silicon carbide and from about 3% to about 12% of alumina. The aggregates prepared in this manner were then etched by treating for 2 minutes with 5% hydrofluoric acid, washed and dried under a vacuum.

The etched silicon carbide support material was then silvered by the procedure employed in Example I, with the exception that after the silvering operation had been completed, the spent silvering solution was drained from the silvered catalyst, which was then washed thoroughly with distilled water and leached with water for 6 days.

Example III

A catalyst was prepared by mixing together the solutions described in Example I in the same proportions as given therein and then adding the mixture to washed and dried silicon carbide support material. The operations were carried out with sufficient speed to avoid the deposition of silver before the silvering mixture was added to the support material. The mixture was then allowed to stand for 1 hour with occasional shaking, after which the liquid was decanted from the catalyst composition and the latter washed by decantation.

Example IV 100 cc. of support material comprising silicon carbide was activated by immersing it in a 5% solution of hydrofluoric acid for 1 hour at room temperature. After washing and drying, the treated support material was degassed with a vacuum pump for about ½ hour after the pressure reached 1–2 mm. The silvering solutions were then mixed as described in Example III and immediately sucked into the flask containing the support. After intermittent agitation for about two hours, the liquid was decanted from the catalyst and the latter washed by decantation and dried.

Example V

A catalyst was prepared by depositing active silver upon granular, ceramically bonded silicon carbide by the method described in Example II.

An ethylene-air mixture containing 17% by volume of ethylene and 83% by volume of air was passed over 25 cc. of the above-described catalyst at a temperature of about 270° C. and a rate of 60 cc. per minute. After 80 hours of operation a yield of 64% of ethylene oxide based upon the amount of ethylene consumed was obtained, thus demonstrating the durability and long life of the catalyst used.

The catalysts of the invention are highly advantageous and economical for use in a wide variety of chemical treatments and conversions carried out in the liquid, vapor, or mixed vapor-liquid phases. Representative processes in which the catalysts find application are those involving hydrogenation, oxidation, dehydrogenation, rearrangement, etc. Such processes include the oxidation of saturated and unsaturated hydrocarbons, the production of aldehydes and ketones by the oxidation of the corresponding primary and secondary alcohols, the vapor phase hydration of lower olefins, the production of vinyl and other unsaturated ethers from aliphatic or aromatic acetals, the preparation of phenolic substances as illustrated by the hydrolysis of chlorobenzene to phenol, the hydrolysis of dichlorobenzene to dihydroxybenzene, the production of hydrocyanic acid from mixtures of ammonia, oxygen, and aliphatic or aromatic hydrocarbons, and in many hydrogenation and dehydrogenation reactions such as the reduction of nitro aromatic compounds to the corresponding amines, or the dehydrogenation of unsaturated amines to unsaturated nitriles in the presence of oxygen and oxygen-containing gases.

The catalysts of the invention are particularly effective in catalyzing the direct oxidation of olefins to the corresponding olefin oxides, for example, of ethylene to ethylene oxide. This use of the catalysts is described and claimed in the copending application, Serial No. 498,431 filed August 11, 1943.

We claim as our invention:

1. A catalyst composition consisting essentially of particles of a material selected from the group consisting of silicon, silicon carbide and silicon-silicon carbide mixtures, and an adherent pellicular deposit of silver metal formed upon and in the presence of said particles by the action of a reducing agent upon an ammoniacal solution of a silver salt and a strong base.

2. A catalyst composition consisting essentially of particles of silicon carbide, and an adherent pellicular deposit of silver metal formed upon and in the presence of said particles by the action of a reducing agent upon an ammoniacal solution of a silver salt and strong base.

3. A catalyst composition consisting essentially of particles of elemental silicon, and an adherent, pellicular deposit of silver metal formed upon and in the presence of said particles by the action of a reducing agent upon an ammoniacal solution of a silver salt and a strong base.

4. A catalyst composition consisting essentially of particles of ceramically bonded silicon carbide containing at least 60 to 80% by weight of silicon carbide and about 3 to about 12% by weight of alumina, and an adherent pellicular deposit of silver metal formed upon and in the presence of said particles by the action of a reducing agent upon an ammoniacal solution of a silver salt and a strong base.

5. A catalyst composition consisting essentially of particles of ceramically bonded elemental silicon containing at least 60 to 80% by weight of elemental silicon and about 3 to about 12% by weight of alumina, and an adherent pellicular deposit of silver metal formed upon and in the presence of said particles by the action of a reducing agent upon an ammoniacal solution of a silver salt and a strong base.

6. A catalyst composition consisting essentially of granules of a support material selected from the group consisting of silicon, silicon carbide, and silicon-silicon carbide mixtures and an adherent, uniform, pellicular deposit of silver metal formed upon and in the presence of the support material by mixing granules of the support material with an aqueous solution of silver nitrate, adding ammonium hydroxide to the resulting mixture in an amount substantially only sufficient to dissolve any silver-containing precipitate caused by the addition of the ammonium hydroxide to the silver nitrate solution, introducing an aqueous sodium hydroxide solution into the said mixture in an amount sufficient to precipitate the silver in the form of silver oxide, adding ammonium hydroxide in an amount substantially only sufficient to redissolve the silver and maintain it in solution, reacting said solution with a glucose solution for a period of time sufficient to effect the formation of an adherent, uniform, pellicular deposit of silver upon the support material, and separating the silvered support material from the reaction mixture.

7. A process for the production of silver catalysts which comprises mixing granules of a support material consisting of silicon carbide with an aqueous solution of silver nitrate, adding ammonium hydroxide to the resulting mixture in an amount substantially only sufficient to dissolve any silver-containing precipitate caused by the addition of the ammonium hydroxide to the silver nitrate solution, introducing an aqueous sodium hydroxide solution into the said mixture in an amount sufficient to precipitate the silver in the form of silver oxide, adding ammonium hydroxide in an amount substantially only sufficient to redissolve the silver and maintain it in solution, reacting said solution with a glucose solution for a period of time sufficient to effect the formation of an adherent, uniform, pellicular deposit of silver upon the support material, and separating the silvered support material from the reaction mixture.

8. A method for preparing catalyst compositions which comprises forming a mixture of a support material selected from the group consisting of silicon, silicon carbide and silicon-silicon carbide mixtures and an aqueous ammoniacal solution of a silver salt, introducing an aqueous sodium hydroxide solution into said mixture in an amount sufficient to precipitate the silver in the form of silver oxide, adding ammonium hydroxide in an amount substantially only sufficient to redissolve the silver and maintain it in solution, reacting said solution with a reducing agent for a period of time sufficient to effect the formation of an adherent, uniform, pellicular deposit of silver upon the support material, and separating the silvered support material from the reaction mixture.

INGOLFUR BERGSTEINSSON.
HARRY DE V. FINCH.

REFERENCES CITED

The following references are of record in the file of this patent:

UNITED STATES PATENTS

| Number | Name | Date |
|---|---|---|
| 1,739,306 | Holmes | Dec. 10, 1929 |
| 2,113,977 | Barnes | Apr. 12, 1938 |
| 2,034,077 | Arnold et al. | May 17, 1936 |
| 1,519,470 | Wilson et al. | Dec. 16, 1924 |
| 2,355,933 | Weiss | Aug. 15, 1944 |

FOREIGN PATENTS

| Number | Country | Date |
|---|---|---|
| 229,774 | Great Britain | Mar. 2, 1925 |
| 397,161 | Great Britain | Aug. 3, 1933 |

OTHER REFERENCES

Pottery & Glassware Report, 1887, Article on The Process of Silvering Glass.

The Making of Mirrors by the Deposition of Metal on Glass, Circular #389 of the Bureau of Standards, pages 2-11, 1931.